Feb. 23, 1965  F. D. WERNER ETAL  3,170,328
TOTAL TEMPERATURE PROBE
Filed June 13, 1961

INVENTORS
FRANK D. WERNER
AND ROBERT E. KEPPEL
BY
ATTORNEYS

United States Patent Office 3,170,328
Patented Feb. 23, 1965

3,170,328
TOTAL TEMPERATURE PROBE
Frank D. Werner and Robert E. Keppel, Minneapolis, Minn., assignors to the United States of America as represented by the Secretary of the Air Force
Filed June 13, 1961, Ser. No. 116,898
1 Claim. (Cl. 73—349)

The present invention relates to temperature-responsive devices, and more particularly to a total temperature probe adapted for accomplishment of subsonic and supersonic, high temperature gas measurements as a function of the change of resistance occurring with changes in temperature.

More specifically, the novel probes developed are intended to measure total temperature for flight in the atmosphere up to 80,000 ft., for Mach numbers up to 3.0.

As the flight speed increases, frictional heating begins to become significant and a distinction is necessary between "static" temperature and "total" temperature. Static temperature is the temperature of the air at a distance from the airplane. Total temperature is also called "stagnation" temperature.

Total temperature $T_0$, is related to static, free stream temperature $T_s$, by the following equation:

$$T_0/T_s = 1 + \frac{(V-1)}{2} M^2$$

where V is the ratio of specific heats and M is the Mach number.

Gas temperature measurements may be divided into two conditions of operation: (1) incompressible flow velocities or no flow where static and total temperatures are identical; and (2) measurements of the total or static temperature of gases at sufficiently high velocities that compressibility effects are significant.

The present invention represents an improvement over the issued Patent No. 2,970,475 to F. D. Werner entitled Gas Temperature Probe.

Many types of gas temperature probes are in use, but the problems of measurement of gas temperature at high temperature and low density are especially difficult. Temperature-responsive devices are commonly subject to: (1) radiation errors which cause the sensing element to read lower than the correct value because of heat loss from the outer surface of said element; (2) conduction errors if the leads or other supports connected to the sensing element are at a different temperature from the element; (3) recovery errors if the Mach number of the flow over the sensing element approaches compressibility values, heat is conducted from the gas at the surface of the sensing element through the boundary layer to the outer gas layers.

Because of these errors, existing total temperature probes are not capable of measuring total stagnation temperatures that result from aircraft or missiles traveling at speeds greater than Mach 1.0. Also, prior art probes do not have the the accuracy and time response required to generate electrical signals useful as an input to air data computers, fire control systems, and navigational and bombing systems.

Accordingly, it is an object of the persent invention to provide total temperature probes which provide substantially accurate changes in resistance as a function of temperature at high speed gas flow and low densities.

Another object of the present invention is to provide total temperature probes which provide substantially accurate changes in resistance as a function of temperature by controlling the environment in the vicinity of the sensing element thereof.

Still another object of the present invention is to provide total temperature probes which provide an electrical quantity for the measuring and recording of temperature changes in a medium of low density, flowing at high speed.

A further object of this invention is to provide total temperature probes that are rugged, resistant to humidity and corrosion, and stable in response.

A still further object of this invention is to provide total temperature probes which have negligible radiation and conduction errors and minimum recovery errors.

A still further object of this invention is to provide probes suitable for use on supersonic aircraft and missiles for the measurement of total temperature.

Accordingly, the present invention provides new type temperature probes fabricated with multiple shields around the sensing element, including sonic orifices positioned downstream of said shields for controlling the environment around said sensing element and in the space between the radiation shields.

The sensing element for said probes is a hermetically sealed 50 ohm platinum resistance thermometer element of a novel design and is more completely described in our copending application, Serial No. 116,897, entitled "Resistance Temperature Detector" filed even date therewith. In the present invention, said sensing element is included in a plurality of radiation shields. Since the shields are also heated by the gas flow to the total temperature, radiation errors of the sensing device are minimized. The novel design of the probe enables a substantially large portion of the lead-in wires to be immersed in the medium of flow; thereby errors caused by conduction of heat along the leads are minimized. Another novel feature of the present invention is that location of sonic throats downstream of the sensing element and the radiation shields, controls the Mach number of flow around the sensing element and in the space between the shields, thereby minimizing recovery errors. An external resistance measuring circuit connected to the total temperature probe enables temperature measurements to be made at any convenient distance from said probe.

The novel design of the probe also renders it useful for accurate low speed gas flow or liquid medium, temperature measurements by the use of an aspirator to maintain flow in a manner common to the art.

These objects and other advantageous features of the present invention will be more fully understood by reference to the following detailed description when taken in conjunction with the accompanying drawings wherein.

Figure 1:
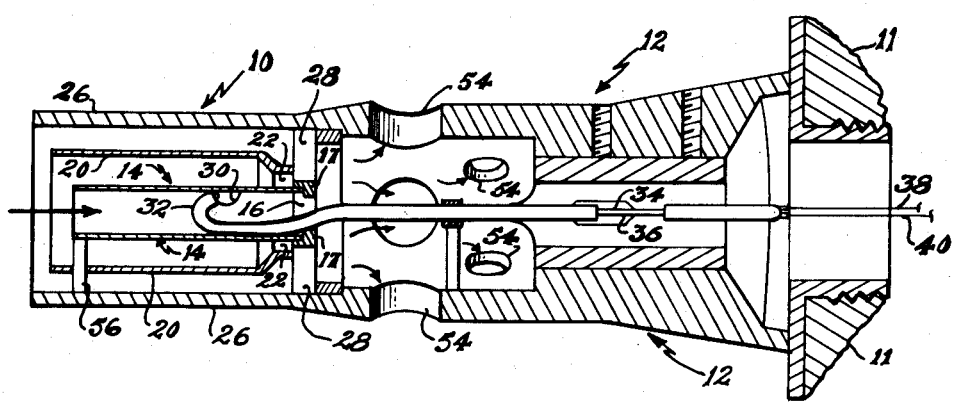
FIGURE 1 is a longitudinal sectional view of a device embodying the invention.
Figure 3:
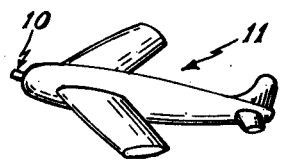
FIGURE 3 is an illustration of a preferred location of the invention on an aircraft.

Referring now to FIGURE 1, there is shown a total temperature probe 10, including a base portion 12 having openings therein for mounting the probe on a vehicle 11 to have the probe 10 exposed to a fluid, such as a gaseous environment, shown in FIGURE 3.

As shown in FIGURE 1, some of the major elements of the probe are sensing device 14 and sonic throat 16 having an orifice therein, attached at one end thereof (controls flow inside sensing element); an inner radiation shield 20 and sonic throat 22 having an orifice therein, attached at one end thereof (controls flow outside sensing element); and an outer shield 26 and sonic throat 28 having an orifice therein, attached at one end thereof (controls flow between inner and outer shields). The flow inside the probe is considered laminar and is approximately incompressible.

Figure 2:
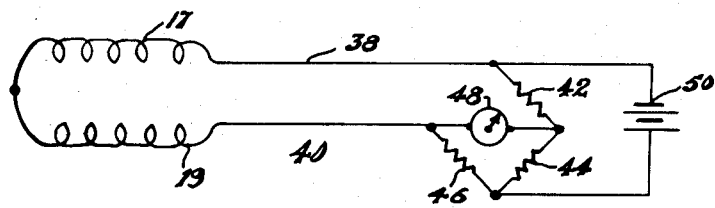
FIGURE 2 is a diagram of electrical elements useful in one application of the invention.

The novel hermetically sealed sensing device 14, as more fully described in our copending application, Serial No. 116,897 entitled, "Resistance Temperature Detector," filed on even date herewith, includes a 0.002 inch diameter platinum resistance wire wound on an inner cylindrical section in the form of a double thread 17 and 19 as shown in schematic form in FIGURE 2 and as more fully shown in FIGURES 1 and 3 of said co-pending application. The length of the wire is adjusted to yield a resistance of 50 ohms at 0° C.

Further along the inner section of sensing element 14 is a depressed portion 30 having an opening and a conduit 32 connected thereto. The ends of the resistance wire are connected to gold wire leads 34 and 36 insulatedly disposed in conduit 32. Each end of conduit 32 is hermetically sealed. The other ends of gold leads 34 and 36 are connected to electrical leads 38 and 40.

The downstream end of sensing element 14 is gold soldered for a hermetic seal to one end 17 of sonic throat 16. Sonic throat 16 is a gold-platinum alloy, conical body having a central opening therein of suitable dimensions for controlling airflow therethrough.

An important feature of our probe design is that having the sonic throat downstream of the sensing element enables a substantial length of leads 34 and 36 to be immersed in the stagnation air to minimize errors caused by conduction of heat along the leads. By the use of 0.020 inch diameter gold wire and by grounding one end of the resistance element, it is possible to obtain lead resistance which is only 0.012 percent of the 50 ohm resistance of the winding, which is equivalent to 0.03 degree centigrade, and a negligible value.

The two ends of the resistance wire in sensing element 14 through connection to gold wire leads 34 and 36 and connections 38 and 40 form one leg of a conventional resistance measuring circuit, such as a Wheatstone bridge as shown in FIGURE 2. Resistances 42, 44 and 46 form the other legs of the Wheatstone bridge which also includes galvanometer 48 and D.-C. voltage source 50. Also, a high gain D.-C. amplifier may be used to detect the unbalance (due to a change in temperature of the gas flow changing the resistance of sensing element 14) in a bridge measuring circuit, said amplifier having an output sufficient to drive a strip-chart recorder, and/or the output can be applied as an input of temperature data to fire control systems, air data computers, and the like.

The resistance versus temperature relationship of the wire follows the well-known Callender-Van Dusen relationship and is useful over the temperature range, $-183°$ C. to 1200° C. Therefore, temperature observations or recordings of resistance changes can be directly obtained on scales calibrated in degrees.

An unexpected result has been found in that the reactance of sensitive element 14 is capacitive; whereas, ordinarily non-inductively wound wire resistances have appreciable inductance. The probe operates satisfactorily up to about 10 kc. or more. Also, 10 milliamperes may be safely dissipated by the wire without significant heating of the wire during measurement.

The total temperature rises very rapidly as the Mach number increases; therefore, radiation heat loss from the sensing element is an important source of error to control. Radiation errors of the sensing device are reduced by the surrounding surface of radiation shield 20. Shield 20 is also heated by gas flow to the total temperature, thereby reducing the net radiation heat loss from the sensing element.

Additionally, it has been found that radiation errors depend directly on the "shininess" or polish of the radiation emitting and receiving surfaces. Generally speaking, a dull surface is a good radiator and receiver of radiant energy and a shiny surface reduces such a heat transfer. Consequently, it is desirable to have well polished surfaces of metals having low emissivity for the sensing device and for the shields employed therefor. Emissivity is determined principally by the choice of materials. We have found that use of gold rich alloys (90% Au and 10% Pt) provides low emissivity values for the radiation shields, resulting in significant reduction of radiation errors. Use of this material for shields is limited to temperatures below about 900° C. or 1000° C. Also, said gold rich alloy can be highly polished, retains its high polish when in use, is resistant to oxidation, and possesses good strength at elevated temperatures. Addition of more radiation shields involves progressively less improvement for each shield added so that more than four or five shields show little gain.

Another feature of the novel probe is that sensing element 14 is recessed within inner shield 20 and shield 20 is recessed within outer shield 26. Therefore, the entrance conditions for our probe result in higher average heat transfer coefficients for the inner shield and sensing element and somewhat reduces their loss of radiation out of the open end; i.e. the probe "looks" at an environment which is the same temperature as the sensing element. At the rear end the probe sees a relatively cool environment and has the desired radiation environment at this end.

The outer shield 26 of precious metal can be replaced with a stainless steel outer shield. The stainless steel outer shield is not particularly effective as a radiation shield; however, it will provide stagnation conditions on the outside of the intermediate shield, which is substantially better from the heat transfer point of view than the situation which would exist if the outer shield were absent, because supersonic flow on the outside of intermediate shield 20 would then exist.

Recovery errors are minimized by the novel means of locating sonic orifice 16 aft of sensing element 14, orifice 22 aft of inner shield 20 and orifice 28 aft of outer shield 26. These orifices control the Mach number of the gas flow inside the sensing element, around the sensing element, and between the radiation shields or stagnation chambers and being about semi-stagnation conditions inside the probe with the attendant adiabatic rise toward the true stagnation temperature.

It has been found that use of too small a value for this Mach number results in negligible recovery errors, but the gas then flows so slowly over the sensing element that inadequate convective heat transfer to the resistance wire is present, and radiation and/or conduction errors are excessive. On the other hand, if too high a value of Mach number is used for the gas flow over the sensing element, the recovery error will be excessive.

If the Mach number of flow over sensing element 14 approaches compressibility values (say Mach number 0.2 or more), the sensing element will tend toward a value intermediate between ambient temperature $T_s$ and total temperature $T_0$.

The Mach number of flow upstream of the sonic orifice in an arrangement such as used for these probes is uniquely determined by the ratio of the area of the sonic device to the cross-sectional area for air flow upstream thereof in the vicinity of the sensing element, both areas being measured in a plane perpendicular to the air flow direction.

The preferred embodiment of this invention has a Mach number of 0.4 within shields 20 and 26 for high heat transfer to the shields and Mach number of 0.3 within the inner shield for a moderate heat transfer and moderate recovery error. Another embodiment of this invention, having respective internal Mach numbers of 0.3 and 0.2 has a slightly lower recovery error but exhibits a slightly higher radiation error and a higher time constant.

Without the bleed holes 54, the heat lost to the structure of the probe would immediately lower the temperature of the air sample; the bleed holes 54 permit continuous heat addition to eliminate this difficulty.

A plurality of spaced metal tabs, e.g. 56, are soldered between the outer shield 26 and the inner shield 20 and the sensing element 14 for connecting and holding these components together.

In a supersonic airstream the total temperature probe will be preceded by a detached shock wave which, in the area equal to the area of the cross-section of the probe, can be assumed for practical purposes to be a normal shock wave. The effect of shock waves upstream of the total temperature probe is substantially negligible in practical cases. Generally, the location of the probe on nearly any region on the forward end of the fuselage is satisfactory if the boundary-layer requirements are met.

The preferred embodiment is designed for moderate operating temperatures, up to about 900° C., because the melting temperature of the 90% gold and 10% platinum shields is about 1100° C.

For highest accuracy measurements, it is profitable to distinguish another range of temperature, extended to 400° C. or lower. In this case, the probe design involves lower internal Mach numbers. For lower internal Mach numbers, it can be shown that the recovery error varies approximately with the square of the internal Mach number; so it is clear that for such a low temperature design very low recovery errors would be exhibited. On the other hand, radiation errors would be somewhat increased, and it would be necessary to make a compromise between these two sources of error. For low operating temperatures, the shields need not be solid gold-rich alloy. Silver would retain a highly polished surface of about the same (or even lower) emissivity. Electroplating on cheaper materials would also be satisfactory.

Also for low speed gas or liquid temperature measurements, the outer tube and the sonic orifice at the rear of the sensing element are unnecessary.

For application to gases containing materials which will reduce emissivity, a rough, dark finish is deliberately produced on the shields, so that the changes in emissivity will be small.

Having described the principles of the present invention, in conjunction with a particular embodiment, it is desirable not to limit the scope of the present invention to the size, dimensions, or materials selected for fabricating the embodiment since other equivalents will suggest themselves to persons skilled in the prior art without departing from the scope of the present invention. Accordingly, the present invention should be interpreted by the appended claim.

What is claimed is:

A temperature probe for measuring the temperature of a fluid medium consisting of a trio of concentric cylinders, said cylinders being positioned such that said fluid medium flows parallel to their longitudinal axis, a temperature-sensitive resistance element being included in the innermost cylinder, a pair of velocity controls positioned at the downstream end of said cylinders, one of said velocity controls being placed between the outermost cylinder and the middle cylinder and the other of said velocity controls being positioned between the middle cylinder and the innermost cylinder, and a cylindrical housing connected to said outermost cylinder at the downstream end thereof, said housing having a plurality of bleed openings for permitting continuous flow therethrough.

References Cited by the Examiner
UNITED STATES PATENTS

| | | | |
|---|---|---|---|
| 2,379,530 | 7/45 | Lederer | 73—362 |
| 2,588,840 | 3/52 | Howland | 73—349 |
| 2,967,429 | 1/61 | Taylor | 73—359 |
| 2,970,475 | 2/61 | Werner | 73—349 |

ISAAC LISANN, *Primary Examiner.*